United States Patent
Shimizu

(10) Patent No.: US 10,291,083 B2
(45) Date of Patent: May 14, 2019

(54) ELECTRONIC APPARATUS AND ORIENTATION DETERMINATION METHOD

(71) Applicant: SEIKO EPSON CORPORATION, Tokyo (JP)

(72) Inventor: Satoshi Shimizu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 134 days.

(21) Appl. No.: 15/433,617

(22) Filed: Feb. 15, 2017

(65) Prior Publication Data

US 2017/0244289 A1     Aug. 24, 2017

(30) Foreign Application Priority Data

Feb. 22, 2016   (JP) .................................. 2016-031092

(51) Int. Cl.
*H02J 50/90* (2016.01)
*H02J 50/12* (2016.01)

(52) U.S. Cl.
CPC ............... *H02J 50/90* (2016.02); *H02J 50/12* (2016.02)

(58) Field of Classification Search
CPC ................................. H02J 50/90; H02J 50/12
USPC ......................................................... 307/104
See application file for complete search history.

(56) References Cited

U.S. PATENT DOCUMENTS

| | | |
|---|---|---|
| 2012/0236060 A1 | 9/2012 | Saito et al. |
| 2014/0225951 A1 | 8/2014 | Saito et al. |
| 2017/0093172 A1* | 3/2017 | Von Novak, III ...... H02J 5/005 |

FOREIGN PATENT DOCUMENTS

| | | |
|---|---|---|
| CN | 103812149 A | 5/2014 |
| JP | 2012-192994 | 10/2012 |

* cited by examiner

*Primary Examiner* — Carlos D Amaya
(74) *Attorney, Agent, or Firm* — Workman Nydegger

(57) ABSTRACT

An electronic apparatus includes a contactless power receiving unit that receives power supplied by an external contactless power supplying apparatus. The electronic apparatus further includes a first contactless power receiving unit arranged on a first surface, a second contactless power receiving unit arranged on a second surface different from the first surface, and a determination unit that determines a placement orientation of the electronic apparatus on a basis of a power reception state of the first wireless power receiving unit and a power reception state of the second wireless power receiving unit. The determination unit determines that the placement orientation of the electronic apparatus is a placement orientation where a surface on which a contactless power receiving unit that is successfully receiving power is arranged faces the contactless power supplying apparatus, the contactless power receiving unit being one of the first and second contactless power receiving units.

9 Claims, 2 Drawing Sheets

ELECTRONIC APPARATUS AND ORIENTATION DETERMINATION METHOD

BACKGROUND

1. Technical Field

The present invention relates to an electronic apparatus and an orientation determination method.

2. Related Art

There exists an electronic apparatus that can be placed in different orientations and can operate regardless of its orientation. Further, known configurations include a recording apparatus that allows for vertical placement in which a recording medium transport orientation during image recording is a vertical orientation and horizontal placement in which the transport orientation is a horizontal orientation and that includes placement orientation detection means which detects whether the placement orientation corresponds to vertical placement or horizontal placement (refer to JP-A-2012-192994).

The orientation of an apparatus can be detected by using various sensors (an optical sensor, a gyro sensor). However, in consideration of the cost of manufacturing the apparatus, other methods that do not use such sensors have been requested.

SUMMARY

An advantage of some aspects of the invention is to provide an electronic apparatus and an orientation determination method for performing accurate determination of a placement orientation.

According to an aspect of the invention, an electronic apparatus includes contactless power receiving units that receive power supplied by an external contactless power supplying apparatus. The electronic apparatus includes: a first contactless power receiving unit arranged on a first surface; a second contactless power receiving unit arranged on a second surface different from the first surface; and a determination unit that determines a placement orientation of the electronic apparatus on a basis of a power reception state of the first wireless power receiving unit and a power reception state of the second wireless power receiving unit.

According to the configuration described above, the placement orientation of the apparatus can be accurately determined on the basis of the power reception states of the plurality of contactless power reception units provided on the different surfaces of the electronic apparatus. Hence, various sensors for detecting the orientation become not needed.

The determination unit may determine that the placement orientation of the electronic apparatus is a placement orientation where a surface on which a contactless power receiving unit that is successfully receiving power is arranged faces the contactless power supplying apparatus, the contactless power receiving unit being one of the first contactless power receiving unit and the second contactless power receiving unit. Further, the determination unit may determine that the placement orientation of the electronic apparatus is a placement orientation where a surface on which a contactless power receiving unit that is generating a relatively higher voltage is arranged faces the contactless power supplying apparatus, the contactless power receiving unit being one of the first contactless power receiving unit and the second contactless power receiving unit.

With these configurations, by comparing the power reception states of the first contactless power receiving unit and the second contactless power receiving unit, it can be determined which one of the first and second surfaces is facing the contactless power feeding apparatus, i.e., the placement orientation.

When both of a voltage generated in the first contactless power receiving unit and a voltage generated in the second contactless power receiving unit are below a predetermined threshold, the determination unit may externally send a notice indicating an inappropriate placement orientation.

With this configuration, when power cannot be received due to the current placement orientation, a notification of the fact can be sent to a user.

The electronic apparatus may include: a transport unit that transports a recording medium along a transport path by a predetermined transport amount; a recording unit that performs recording on a transported recording medium; and a transport amount correction unit that corrects the transport amount in accordance with a determination result regarding the placement orientation.

With this configuration, transport of the recording medium by an appropriate amount can be performed independently of the placement orientation of the electronic apparatus.

The technological object of the invention can also be realized without using an electronic apparatus. For example, a method (an orientation determining method for determining the placement orientation of an electronic apparatus) including the steps executed by the determination unit can be thought to be an invention. A program causing a computer to execute such a method and a computer readable recording medium storing the program can each be thought to be an invention. Further, a system including the electronic apparatus and contactless power feeding apparatus described above can be thought to be an invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. Note that each drawing is only an illustration for describing the present embodiment.

Figure 1:
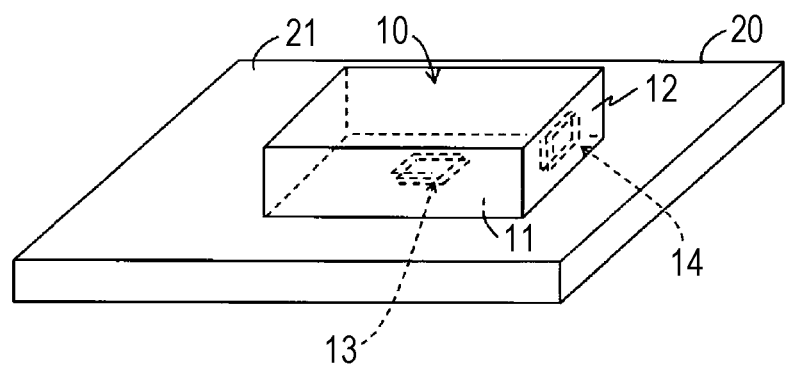
FIG. 1 is a diagram illustrating an electronic apparatus in a horizontal placement orientation.
Figure 2:
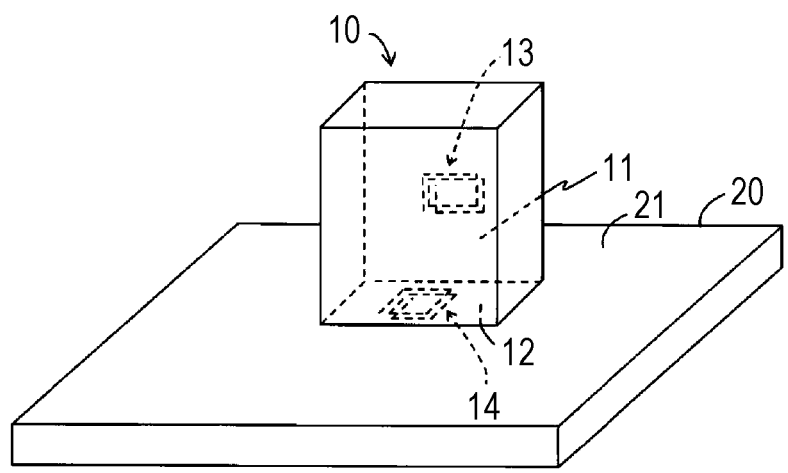
FIG. 2 is a diagram illustrating the electronic apparatus in a vertical placement orientation.

FIG. 1 and FIG. 2 each illustrate the simplified external view of an electronic apparatus 10 according to the present embodiment by using a perspective diagram. The casing of the electronic apparatus 10 is a polyhedron and substantially shaped like a box in the examples of FIGS. 1 and 2. The electronic apparatus 10 represents various versatile products such as a printer, a scanner, a game machine, a display apparatus, a mobile phone, and the like.

The electronic apparatus 10 can take at least two placement orientations. The example of FIG. 1 illustrates the placement orientation of the electronic apparatus 10 when a first surface (surface 11) among the plurality of surfaces forming the electronic apparatus 10 is a bottom surface. The placement orientation of the electronic apparatus 10 illustrated in FIG. 1 is also called a horizontal placement orientation (or horizontal placement). On the other hand, the example illustrated in FIG. 2 illustrates the placement orientation of the electronic apparatus 10 when a second surface (surface 12) among the plurality of surfaces forming the electronic apparatus 10 is the bottom surface. The placement orientation of the electronic apparatus 10 illustrated in FIG. 2 is also called a vertical placement orientation (or vertical placement). The area of the surface 11 is larger than the area of a surface 12. Further, the height of the electronic apparatus 10 in the vertical placement orientation is larger than the height of the electronic apparatus 10 in the horizontal placement orientation.

The electronic apparatus 10 is placed on the top of an external contactless power feeding apparatus 20. FIGS. 1 and 2 each illustrate an upper surface 21 of the contactless power feeding apparatus 20. When placing the electronic apparatus 10 on the upper surface 21 of the noncontact power feeding apparatus 20, a user can place it vertically or horizontally. Any of the surfaces 11 and 12 of the electronic apparatus 10 is a surface on which, for example, an operation unit (a button, a switch, a touch panel, or the like for user operation) or a connection terminal (not illustrated), or a display unit 19 described later, included in the electronic apparatus 10 is not provided. It can be said that FIGS. 1 and 2 illustrate a system including the electronic apparatus 10 and the contactless power feeding apparatus 20.

Contactless power feeding (also called noncontact power feeding or wireless power feeding) is performed by the contactless power feeding apparatus 20 for the electronic apparatus 10 placed on the upper surface 21. The electronic apparatus 10 includes a contactless power receiving unit that receives power supplied from the contactless power feeding apparatus 20. Owing to contactless power supply, the electronic apparatus 10 can obtain power and operate. Examples of various usable standards of contactless power feeding include an electromagnetic induction method in which a current is induced in a coil on the power receiving side by making a current flow through a coil embedded on the power transmitting side, thereby generating magnetic flux, a magnetic field resonance method in which power is transmitted by making resonators on the power transmitting side and the power receiving side resonate through magnetic field resonance, a radio wave reception method in which an electromagnetic wave generated on the power transmitting side is received and converted into a DC current and utilized on the power receiving side, and the like. The coils may be called antennas.

In the present embodiment, a coil (not illustrated) is embedded in the contactless power feeding apparatus 20 near the upper surface 21. The contactless power feeding apparatus 20 causes a current to flow through the coil and causes a current (an induction current) to be generated in the coil on the electronic apparatus 10 side by electromagnetic induction. The electronic apparatus 10 includes a coil 13, as a first contactless power receiving unit, arranged on the surface 11 and a coil 14, as a second contactless power receiving unit, arranged on the surface 12. In FIGS. 1 and 2, the coils 13 and 14 are illustrated using broken lines. The numbers of the windings and the sectional areas of the coils 13 and 14 are basically the same. The coils 13 and 14 cannot be seen in the external view of the electronic apparatus 10. The coil 13 is arranged on the inner side of the surface 11. The coil 13 may be in contact with or not in contact with the surface 11, but the surface closest to the coil 13 among surfaces forming the electronic apparatus 10 is the surface 11. Similarly, the coil 14 is arranged on the inner side of the surface 12. The coil 14 may be in contact with or not in contact with the surface 12, but the surface closest to the coil 14 among surfaces forming the electronic apparatus 10 is the surface 12.

Figure 3:
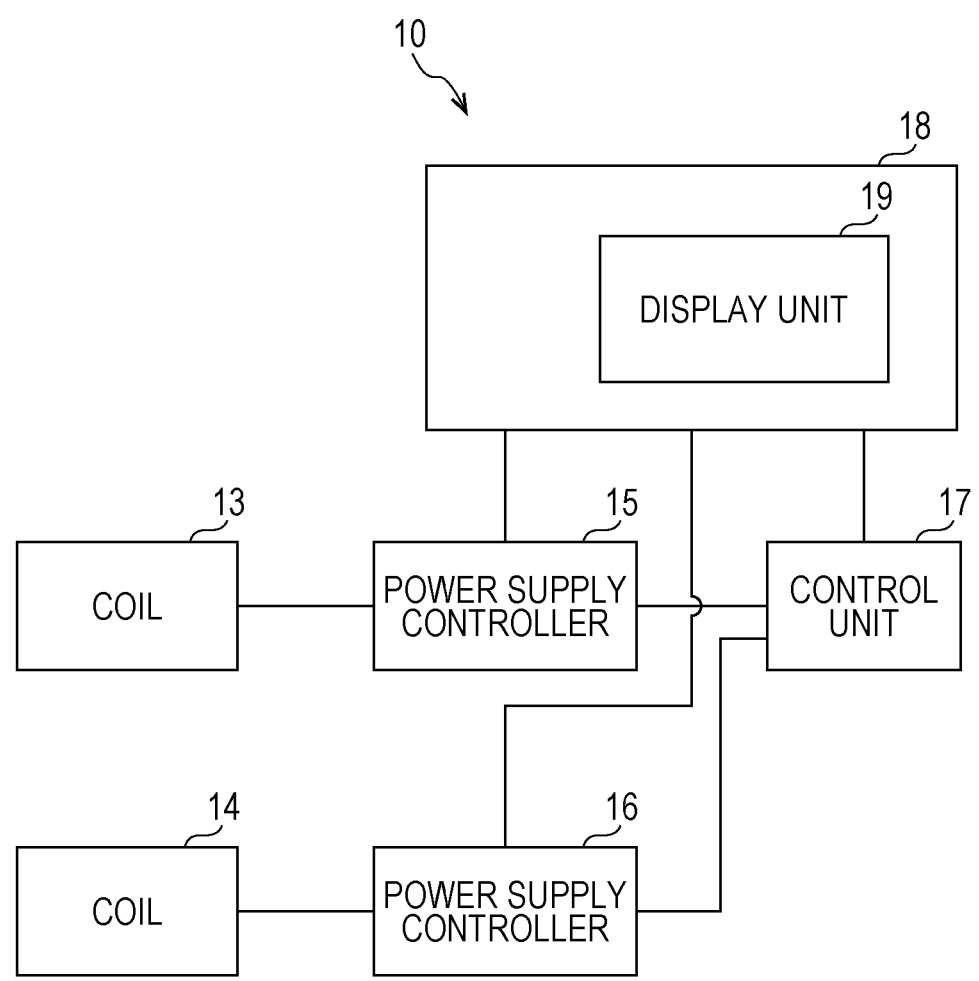
FIG. 3 is a block diagram illustrating part of the configuration of the electronic apparatus.

FIG. 3 illustrates part of the configuration of the electronic apparatus 10 in a simplified manner using a block diagram. The electronic apparatus 10 includes the coils 13 and 14, a power supply controller 15 connected to the coil 13, a power supply controller 16 connected to the coil 14, a control unit 17 connected to the power supply controllers 15 and 16, the display unit 19 controlled by the control unit 17, and the like. The power supply controller 15 supplies power based on a current generated in the coil 13 to an operation unit 18 within the electronic apparatus 10. Similarly, the power supply controller 16 supplies power based on a current generated in the coil 14 to the operation unit 18. Any configuration component that is driven by supply of power among the configuration components included in the electronic apparatus 10 corresponds to the operation unit 18. For example, when the electronic apparatus 10 is a printer, the operation unit 18 refers to any of a recording head ejecting liquid, a motor for moving a carriage, and the like. The display unit 19 is also an example of the operation unit 18. The examples of the operation unit 18 are versatile and, hence, the description thereof is omitted here.

The control unit 17 is configured to include, for example, an IC including a CPU, a ROM, a RAM, and the like, and other storage media and the like. The control unit 17 performs arithmetic operations in accordance with a program stored in the ROM and the like, using the RAM or the like as a work area, thereby controlling the behavior of the electronic apparatus 10. The control unit 17 also functions as a determination unit that determines the placement orientation of the electronic apparatus 10 on the basis of the power reception state of the first contactless power receiving unit (coil 13) and the power reception state of the second contactless power receiving unit (coil 14). It can be said that the control unit 17 described above is an execution unit performing the orientation determination method that determines the placement orientation of the electronic apparatus 10 on the basis of the power reception state of the first contactless power receiving unit (coil 13) arranged on the first surface (surface 11) of the electronic apparatus 10 and the power reception state of the second contactless power receiving unit (coil 14) arranged on the second surface (surface 12) of the electronic apparatus 10 different from the first surface.

The control unit 17 as a determination unit, on the basis of respective power reception states obtained through the power supply controllers 15 and 16, determines whether the electronic apparatus 10 has the horizontal placement orientation or the vertical placement orientation. Specifically, the control unit 17 determines that the placement orientation of the electronic apparatus 10 is an orientation in which a surface on which a coil successfully receiving power, among the coils 13 and 14, is arranged is facing the contactless power feeding apparatus 20. In the present specifications, the horizontal placement orientation may be called a first placement orientation. Further, in the present specifications, the vertical placement orientation may be called a second placement orientation. Referring to FIG. 1, if there is a positional relationship in which the surface 11 faces the contactless power feeding apparatus 20 (upper surface 21), an induction electromotive force (voltage) and an induction current are generated in the coil 13 by the electromagnetic induction. The power supply controller 15 outputs a signal (first voltage level signal) in accordance with the voltage generated in the coil 13 to the control unit 17. When, for example, the first voltage level signal has a level higher than or equal to a predetermined threshold, the control unit 17 determines that the coil 13 is a coil successfully receiving power, that is, the current placement orientation is a placement orientation (=horizontal placement orientation) in which the surface 11 on which the coil 13 is arranged is facing the contactless power feeding apparatus 20.

On the other hand, referring to FIG. 2, if there is a positional relationship in which the surface 12 faces the contactless power feeding apparatus 20 (upper surface 21), an induction electromotive force (voltage) and an induction current are generated in the coil 14 by electromagnetic induction. The power supply controller 16 outputs a signal (second voltage level signal) in accordance with the voltage generated in the coil 14 to the control unit 17. When, for example, the second voltage level signal has a level higher than or equal to the predetermined threshold, the control unit 17 determines that the coil 14 is a coil successfully receiving power, that is, the current placement orientation is a placement orientation (=vertical placement orientation) in which the surface 12 on which the coil 14 is arranged is facing the contactless power feeding apparatus 20. The power supply controllers 15 and 16 and the control unit 17 may have a configuration in which they are formed in a single chip. Further, the power supply controllers 15 and 16 and the control unit 17 may be collectively called a determination unit.

The control unit 17, when determining that the orientation is a horizontal placement orientation, can perform predetermined control corresponding to a horizontal placement orientation, and when determining that the orientation is a vertical placement orientation, the control unit 17 can perform predetermined control corresponding to a vertical placement orientation. The control corresponding to a horizontal orientation and the control corresponding to a vertical orientation include making the display orientation on the display unit 19 correspond to one of the horizontal placement orientation and the vertical placement orientation.

There may be a case in which it can be determined that both of the coil 13 and the coil 14 are successfully receiving power, depending on the positional relationship between the coil on the contactless power feeding apparatus 20 side and the coils 13 and 14 on the electronic apparatus 10 side. Hence, the control unit 17 may determine that the current placement orientation is an orientation in which a surface on which a coil generating a relatively high voltage among the coils 13 and 14 is arranged is facing the contactless power feeding apparatus 20. In other words, the control unit 17 compares the first voltage level signal and the second voltage level signal with each other. In the case where the first voltage level signal is higher, it is determined that the current placement orientation is a placement orientation (=horizontal placement orientation) in which the surface 11 on which the coil 13 is arranged is facing the contactless power feeding apparatus 20. On the other hand, in the case where the second voltage level signal is higher, it is determined that the current placement orientation is a placement orientation (=vertical placement orientation) in which the surface 12 on which the coil 14 is arranged is facing the contactless power feeding apparatus 20. With such a configuration, even when both of the first voltage level signal and the second voltage level signal have the predetermined threshold value or higher, the placement orientation of the electronic apparatus 10 can be accurately determined.

One cannot discount the possibility that a user may wrongly place the electronic apparatus 10 on the upper surface 21 in such a manner that a surface other than the surfaces 11 and 12 of the electronic apparatus 10 is a bottom surface. In the case of an orientation in which a surface other than the surfaces 11 and 12 is the bottom surface, normal contactless power feeding is not performed and the electronic apparatus 10 becomes unable to operate properly. Hence, in the case where both a voltage generated in the coil 13 and a voltage generated in the coil 14 are below the predetermined threshold, the control unit 17 may send to the outside a notice (placement error notice) indicating an inappropriate placement orientation. When both the first voltage level signal and the second voltage level signal are below the predetermined threshold value, the control unit 17 issues a placement error notice. The control unit 17 is able to make the display unit 19 display a message of placement error notice, or perform placement error notification using audio output from a loud speaker (not illustrated) included in the electronic apparatus 10.

A placement error notification allows a user to be notified that the placement orientation of the electronic apparatus 10 is not appropriate. Note that the control unit 17 may include a storage battery that stores part of power received by the coil 13 or the coil 14. A configuration may be employed in which the control unit 17, even when neither of the coils 13 and 14 can receive power, makes itself, the display unit 19, the loud speaker, and the like operate for a predetermined period and longer, by using power stored in the storage battery.

In this manner, in the present embodiment, the electronic apparatus 10 can accurately determine the placement orientation of the apparatus 10 on the basis of the power reception states of the plurality of contactless power reception units (coils 13 and 14) provided on the different surfaces of the electronic apparatus 10. Hence, various sensors which have been used for detecting the orientation are not needed and the cost of the product can be reduced.

The invention is not limited to the embodiments described above, and can be implemented in various manners within the scope of the invention. For example, the following modification can be employed.

Assuming that the electronic apparatus 10 is an inkjet printer, the electronic apparatus 10 includes a transport unit (transport rollers and the like) that transports a recording medium along a transport path by a predetermined transport amount, a recording unit (an inkjet head and the like) that performs recording on the transported recording medium, and a transport amount correction unit that corrects the transport amount in accordance with the determination result of the placement orientation. Specific examples of such a printer include a recording apparatus disclosed in JP-A-2012-192994. However, in the present embodiment, the orientation detection unit among configuration components included in the recording apparatus disclosed in JP-A-2012-192994 is not needed. The control unit 17 has the configuration of, for example, the control unit illustrated in FIG. 4 of JP-A-2012-192994. The control unit 17 corrects transport data by addition to and subtraction from a target (paper) transport amount on the basis of the placement orientation of the electronic apparatus 10 determined on the basis of the position of the leading edge of a sheet acquired by a sheet position acquisition unit, a sheet type acquired by a sheet type acquisition unit, transport control table (refer to column 0047 of JP-A-2012-192994), and the placement orientation of the electronic apparatus 10 determined on the basis of the power reception state of the first contactless power reception unit (coil 13) and the power reception state of the second contactless power reception unit (coil 14), as described above.

According to the modification described above, by compensating for the design target transport amount (predetermined transport amount) of a sheet in accordance with the placement orientation of the electronic apparatus 10 (printer), a difference in actual transport amount (amount actually transported) dependent on a placement orientation can be made to be almost zero. Hence, a sheet can be transported accurately during printing and appropriate print processing can be performed for the sheet. Further, the print result does not change depending on the orientation of the apparatus. In other words, favorable print quality can be maintained independent of a horizontal placement orientation or a vertical placement orientation.

The electronic apparatus 10 may have a configuration in which the contactless power receiving unit (coil) is also provided on each surface other than the surfaces 11 and 12 similarly to the surfaces 11 and 12, and it is determined in terms of an orientation which of the plurality of surfaces is facing the contactless power feeding apparatus 20 on the basis of the power reception sates of the plurality of surfaces (three or more surfaces).

The entire disclosure of Japanese Patent Application No. 2016-031092, filed Feb. 22, 2016 is expressly incorporated by reference herein.

What is claimed is:

1. An electronic apparatus including contactless power receiving units that receive power supplied by an external contactless power supplying apparatus, the electronic apparatus comprising:
    a first contactless power receiving unit arranged on a first surface;
    a second contactless power receiving unit arranged on a second surface different from the first surface;
    a determination unit that determines a placement orientation of the electronic apparatus on a basis of a power reception state of the first wireless power receiving unit and a power reception state of the second wireless power receiving unit;
    a control unit that performs processing in accordance with the placement orientation; and
    a display unit;
    wherein, when the determination unit determines that the placement orientation is a first placement orientation, the control unit sets a display orientation in the display unit to an orientation corresponding to the first placement orientation and wherein, wherein the determination unit determines that the placement orientation is a second orientation, the control unit sets a display orientation in the display unit to an orientation corresponding to the second placement orientation.

2. The electronic apparatus according to claim 1, wherein the determination unit determines that the placement orientation of the electronic apparatus is a placement orientation where a surface on which a contactless power receiving unit that is successfully receiving power is arranged faces the contactless power supplying apparatus, the contactless power receiving unit being one of the first contactless power receiving unit and the second contactless power receiving unit.

3. The electronic apparatus according to claim 1, wherein the determination unit determines that the placement orientation of the electronic apparatus is a placement orientation where a surface on which a contactless power receiving unit that is generating a relatively higher voltage is arranged faces the contactless power supplying apparatus, the contactless power receiving unit being one of the first contactless power receiving unit and the second contactless power receiving unit.

4. The electronic apparatus according to claim 1, wherein the determination unit, when both of a voltage generated in the first contactless power receiving unit and a voltage generated in the second contactless power receiving unit are below a predetermined threshold, externally sends a notice indicating an inappropriate placement orientation.

5. The electronic apparatus according to claim 1, further comprising:
    a transport unit that transports a recording medium along a transport path by a predetermined transport amount;
    a recording unit that performs recording on a transported recording medium; and
    a transport amount correction unit that corrects the transport amount in accordance with a determination result regarding the placement orientation.

6. The electronic apparatus according to claim 1, wherein, when the placement orientation of the electronic apparatus is the first placement orientation, performs processing in accordance with the first placement orientation, and when the placement orientation of the electronic apparatus is the second placement orientation different from the first placement orientation, performs processing in accordance with the second placement orientation.

7. The electronic apparatus according to claim 6,
    wherein the first placement orientation is a horizontal placement orientation,
    wherein the second placement orientation is a vertical placement orientation,
    wherein the determination unit determines that the electronic apparatus has the vertical placement orientation when the first contactless power reception unit has succeeded in receiving power and that the electronic apparatus has the horizontal placement orientation when the second contactless power reception unit has succeeded in receiving power, and
    wherein, when it is determined that the electronic apparatus has the horizontal placement orientation, the control unit performs processing corresponding to the horizontal placement orientation, and when it is determined that the electronic apparatus has the vertical placement orientation, the control unit performs processing corresponding to the vertical placement orientation.

8. The electronic apparatus according to claim 7,
    wherein when it is determined that the electronic apparatus has the horizontal placement orientation, the control unit sets the display orientation in the display unit to an orientation corresponding to the horizontal placement orientation and, when it is determined that the electronic apparatus has the vertical placement orientation, the control unit sets the display orientation in the display unit to an orientation corresponding to the vertical placement orientation.

9. An orientation determination method for determining a placement orientation of an electronic apparatus, the method comprising:
    determining, by a determination unit, a placement orientation on a basis of a power reception state of a first contactless power receiving unit arranged on a first surface of the electronic apparatus that includes a contactless power receiving unit receiving supply of power performed by an external contactless power feeding apparatus, and on a basis of a power reception state of a second contactless power receiving unit arranged on a second surface of the electronic apparatus different from the first surface;

setting, by a control unit, a display orientation in a display unit to an orientation corresponding to a first placement orientation when the determination unit determines that the placement orientation is a first placement orientation; and setting, by the control unit, the display orientation in the display unit to an orientation corresponding to a second placement orientation when the determination unit determines that the placement orientation is a second orientation.

* * * * *